(12) United States Patent
Yang et al.

(10) Patent No.: US 9,602,808 B2
(45) Date of Patent: Mar. 21, 2017

(54) STEREOSCOPIC DISPLAY SYSTEM

(71) Applicant: Electronics & Telecommunications Research Institute, Daejeon (KR)

(72) Inventors: Ung Yeon Yang, Daejeon (KR); Seong Won Ryu, Daejeon (KR); Ki Hong Kim, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 487 days.

(21) Appl. No.: 14/140,101

(22) Filed: Dec. 24, 2013

(65) Prior Publication Data

US 2014/0333734 A1 Nov. 13, 2014

(30) Foreign Application Priority Data

May 10, 2013 (KR) ........................ 10-2013-0053375

(51) Int. Cl.
*H04N 9/47* (2006.01)
*H04N 13/04* (2006.01)
(Continued)

(52) U.S. Cl.
CPC ............. *H04N 13/044* (2013.01); *G02B 6/06* (2013.01); *G02B 27/017* (2013.01);
(Continued)

(58) Field of Classification Search
CPC ............. H04N 13/044; H04N 13/0443; H04N 13/0459; H04N 13/0484; G02B 27/017; G02B 27/1066; G02B 2027/0123; G02B 2027/0178; G02B 2027/014; G02B 6/06

USPC .......................................................... 348/53
See application file for complete search history.

(56) References Cited

U.S. PATENT DOCUMENTS 5,416,876 A 5/1995 Ansley et al.
5,748,194 A * 5/1998 Chen ...................... G06T 15/10
345/427

(Continued)

FOREIGN PATENT DOCUMENTS

KR 10-2001-0004427 1/2001
KR 10-2002-0016029 3/2002
(Continued)

OTHER PUBLICATIONS

Chen, Shenchang Eric. "Quicktime VR: An image-based approach to virtual environment navigation." Proceedings of the 22nd annual conference on Computer graphics and interactive techniques. ACM, 1995.*

*Primary Examiner* — Allen Wong
(74) *Attorney, Agent, or Firm* — Kile Park Reed & Houtteman PLLC

(57) ABSTRACT

There is provided a stereoscopic display system that can provide a high resolution, a wide field-of-view, and wearing comfort. The system includes an image generating device configured to display images and decrease a display area on which the images are displayed, an image transmission device configured to transmit the image displayed on the decreased display area, and an image output device configured to enlarge the transmitted image and output a mixed image in which the enlarged image and real-view information are mixed. Therefore, the invention can satisfy main requirements on, for example, resolution, field-of-view, weight, in HMD/FMD/EGD technology, and provide a natural immersive stereoscopic image.

11 Claims, 16 Drawing Sheets

(51) Int. Cl.
  *G02B 27/01* (2006.01)
  *G02B 27/10* (2006.01)
  *G02B 6/06* (2006.01)
(52) U.S. Cl.
  CPC ..... *G02B 27/1066* (2013.01); *H04N 13/0459* (2013.01); *G02B 2027/0123* (2013.01); *G02B 2027/0178* (2013.01); *H04N 13/0443* (2013.01); *H04N 13/0484* (2013.01)

(56) References Cited

U.S. PATENT DOCUMENTS

| | | | | |
|---|---|---|---|---|
| 5,767,924 | A * | 6/1998 | Hiroki | G09G 3/36 348/749 |
| 6,128,108 | A * | 10/2000 | Teo | G06T 3/0081 358/1.9 |
| 6,192,393 | B1 * | 2/2001 | Tarantino | G06T 3/4038 345/419 |
| 6,246,413 | B1 * | 6/2001 | Teo | G06T 17/00 345/419 |
| 6,466,254 | B1 * | 10/2002 | Furlan | H04N 5/2259 348/36 |
| 7,230,766 | B2 | 6/2007 | Rogers | |
| 2010/0315606 | A1 * | 12/2010 | Morikuni | G02B 17/08 353/99 |
| 2011/0181767 | A1 * | 7/2011 | Neutzler | H04N 5/2254 348/340 |

FOREIGN PATENT DOCUMENTS

| | | |
|---|---|---|
| KR | 10-2006-0108881 | 10/2006 |
| KR | 10-2012-0064557 | 6/2012 |
| KR | 10-2013-0097014 | 9/2013 |

* cited by examiner

STEREOSCOPIC DISPLAY SYSTEM

CLAIM FOR PRIORITY

This application claims priority to Korean Patent Application No. 2013-0053375 filed on May 10, 2013 in the Korean Intellectual Property Office (KIPO), the entire contents of which are hereby incorporated by reference.

BACKGROUND

1. Technical Field

Example embodiments of the present invention relate to stereoscopic display technology, and more specifically, to a stereoscopic display system that can provide a high resolution and a wide field-of-view for a user, and a lightweight display device.

2. Related Art

Stereoscopic display technology has repeatedly undergone development and stagnation. It is now used as the basis for virtual reality, which is applied in national defense, construction, tourism, film, multimedia, and games, and recently has been actively used for personal image acquisition in addition to broadcasting and communications.

Specifically, since the human sensory organs that play the largest role in the process of accommodating external information are visual sensory organs, the stereoscopic display technology in the virtual reality is used as a basic device to provide immersion such that a user enters into the virtual reality.

Meanwhile, a representative method of providing realistic virtual/mixed/augmented reality content to the user is using a fully immersive visual interface.

3D movies and 4D theme park attractions are implemented using a large display (a hemisphere-shaped dome). However, according to a principle of stereoscopic image generation using binocular disparity information, the method in which many people view one screen may provide inaccurate 3D stereoscopic image effects to each individual. Therefore, a wearable head mounted display (HMD)/face mounted display (FMD)/eyeglass display (EGD) is used as a personally optimized and accurate immersive stereoscopic image output device.

Theoretically, an interface device needs to provide a wide image with a field-of-view of 100.degree. or more in order for the user to experience complete immersion. Currently commercialized overseas HMD devices have an optical unit and an image output unit to satisfy the above requirement so that they have a weight of several kilograms and a volume of flight helmet, and thereby convenience and usability decrease when the device is used.

There is no technology that fully satisfies all requirements for being as lightweight and wearable as eyeglasses, basically supporting a high resolution (for example, high definition (HD) or above) to enhance the realism and quality of images, and supporting a wide field-of-view similar to human field-of-view characteristics to provide natural image experiences.

An HMD, which has recently been released by a certain Korea company, has a lightweight wearing unit having a weight of 100 g or less, but a resolution of 852×480 (WVGA) and a diagonal field-of-view of about 35°. Therefore, it is difficult to provide the user with a natural immersive image.

As a method of supporting a full HD resolution of 1920×1080, existing technology that mounts a micro display device used for a projection TV or a projector on a HMD (for example, a product of Silicon Micro Display in the USA), or uses a tiled display method of connecting micro display panels in a 2D array (for example, a method used by Sensics company in the USA), is increasing a resolution and a field-of-view.

However, the above-described methods are incapable of simultaneously addressing the problems of field-of-view, weight, and volume.

SUMMARY

Accordingly, example embodiments of the present invention are provided to substantially obviate one or more problems due to limitations and disadvantages of the related art.

Example embodiments of the present invention provide a stereoscopic display system capable of providing a high resolution, a wide field-of-view, and wearing comfort.

In some example embodiments, an image generating device includes an image generation unit that is composed of a video display panel having a plurality of pixels and displays images, and an image compression unit configured to decrease a display area on which the images are displayed.

The image generation unit may display images on the video display panel by allocating a first-sized display area when a first priority is satisfied, and display images on the video display panel by allocating a second-sized display area, smaller than the first-sized display area, when a second priority is satisfied.

The image compression unit may uniformly or non-uniformly divide the display area of the video display panel.

In other example embodiments, an image output device includes an image enlargement unit configured to enlarge received images, and a mixed image output unit configured to output a mixed image in which the enlarged image and real-view information are mixed.

The image output device may further include a projection direction controller configured to perform control such that an output direction of the output mixed image has at least one out of six degrees of freedom.

The mixed image output unit may adjust a focus or a magnification of the enlarged image.

The mixed image output unit may project the enlarged image and reflect the projected image to a specific position.

The mixed image output unit may register the projected image onto one screen using an edge blending method and an image warping method.

In still other example embodiments, a stereoscopic display system includes a video display panel having a plurality of pixels to display images, an optical fiber bundle that is provided to correspond to the plurality of pixels and outputs images displayed by the plurality of pixels, and a mask that is provided between the video display panel and the optical fiber bundle and allows the plurality of pixels to correspond with an incident surface of the optical fiber bundle.

The stereoscopic display system may further include a semi-transparent mirror configured to reflect images transmitted through the optical fiber bundle.

The semi-transparent mirror may have an aspheric shape.

In the semi-transparent mirror, at least one micro lens capable of adjusting a magnification may be provided between an output surface of the optical fiber bundle and a reflecting surface of the semi-transparent mirror.

The stereoscopic display system may further include a corrective curved mask that is provided between the optical fiber bundle and the reflecting surface of the semi-transparent mirror and has a radial structure having a curved surface with an equal interval or an unequal interval.

The stereoscopic display system may further include a curved pixel reflection-transmission adjusting mask that is attached on the reflecting surface of the semi-transparent mirror.

The stereoscopic display system may further include a multi-lens array that is provided between one surface of the video display panel and one surface of the mask, and configured to uniformly or non-uniformly divide an image display area of the video display panel.

The mask may be configured such that each of the plurality of pixels corresponds one-to-one with an incident surface of a corresponding optical fiber included in the optical fiber bundle.

The mask may be configured such that each of the plurality of pixels corresponds with an incident surface of a plurality of optical fibers.

The stereoscopic display system may further include a liquid lens or a projection lens having a fixed magnification that is provided at an output surface of the optical fiber bundle.

The stereoscopic display system may further include a frame on which the video display panel, the optical fiber bundle, and the mask are provided, and the optical fiber bundle may be disposed in the frame.

In still other example embodiments, a stereoscopic display system includes an image generating device that is composed of a video display panel having a plurality of pixels, displays images, and decreases a display area on which the images are displayed, an image transmission device configured to transmit the image displayed on the decreased display area, and an image output device configured to enlarge the transmitted image and output a mixed image in which the enlarged image and real-view information are mixed.

The image output device may perform control such that an output direction of the output mixed image has at least one out of six degrees of freedom.

The image generating device may uniformly or non-uniformly divide the display area of the video display panel.

The image generating device may display images on the video display panel by allocating a first-sized display area when a first priority is satisfied, and display images on the video display panel by allocating a second-sized display area, smaller than the first-sized display area, when a second priority is satisfied.

The image output device may project the enlarged image and register the projected image onto one screen using an edge blending method and an image warping method.

The stereoscopic display system according to an embodiment of the invention includes an image generating device configured to display images and decrease a display area on which the images are displayed, an image transmission device configured to transmit the image displayed on the decreased display area, and an image output device configured to enlarge the transmitted image and output a mixed image in which the enlarged image and real-view information are mixed.

Therefore, the invention can satisfy main requirements on, for example, resolution, field-of-view, and weight, in HMD/FMD/EGD technology, and provide a natural immersive stereoscopic image.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
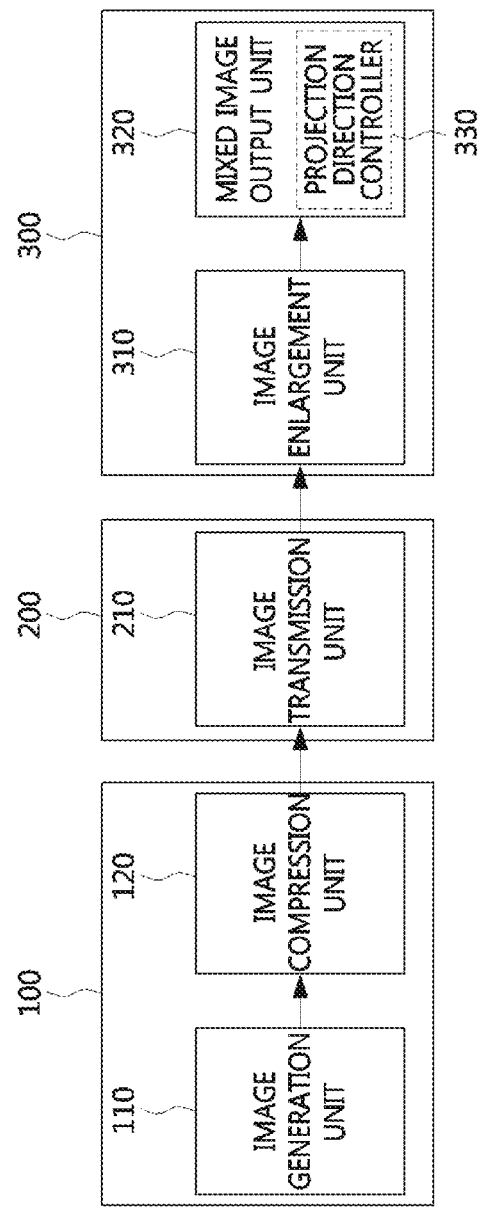
FIG. 1 is a block diagram illustrating a configuration of a stereoscopic display system according to an embodiment of the invention.

Accordingly, while the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. In order to facilitate overall understanding of the invention, like reference numerals in the drawings denote like elements, and thus the description thereof will not be repeated.

FIG. 1 is a block diagram illustrating a configuration of a stereoscopic display system according to an embodiment of the invention.

As illustrated in FIG. 1, a stereoscopic display system 1000 according to the embodiment of the invention may include an image generating device 100, an image transmission device 200, and an image output device 300.

The image generating device 100 may include an image generation unit 110 and an image compression unit 120. The image generation unit 110 uses a variety of image output elements (for example, a plurality of pixels) to generate an image, and the image compression unit 120 decreases a physical space required for delivering a large amount of image information to an image enlargement unit 310.

The image generation unit 110 may include a position correction mask. The position correction mask may have an arbitrary polygonal shape. The mask shape may be changed according to a shape of the image generation unit 110. The position correction mask may be changed to a variety of patterns, for example, a lattice shape, a radial shape, and a uniform or non-uniform partitioning structure, corresponding to various arrangement patterns of a RGBW fluorescent material and structural characteristics (for example, a shape of a projection screen) of the image enlargement unit 310 and the mixed image output unit 320. When generated images are projected onto a projection plane having a variety of shapes, the various patterns described above are necessary in order to actively correspond to different shapes and sizes of areas where images overlap.

Moreover, the image generation unit 110 allows a color source (red, green, blue, and white) group forming one pixel to be projected onto one optical fiber.

For example, when a micro display panel generating a full HD level (1920×1080) pixel is used as a video display panel, the image generation unit 110 applies a 2D mask having m×n (1920×1080) holes therein in units of several um and allows the color source group forming one pixel to be projected onto one optical fiber.

According to another embodiment of the invention, the mask is not limited to a 2D plane, and may be configured with an arbitrary polygonal shape or a curved shape according to a shape of the image generation unit 110.

Moreover, the image generation unit 110 is composed of a video display panel having a plurality of pixels, and displays images on the video display panel by allocating a first-sized display area when a region of interest (a first priority area) is satisfied, and display images on the video display panel by allocating a second-sized display area, smaller than the first-sized display area, when a region not of interest (a second priority) is satisfied.

Furthermore, the panel of the image generation unit 110 may be composed of a single or a plurality of panel modules (otherwise, an arbitrary image information generating module, for example, a CRT, other than a panel shape). That is, the image generation unit 110 may be composed of, for example, a micro display, a small display, a desktop-shaped display, or a large-screen display.

The image compression unit 120 uniformly or non-uniformly divides an image display area of the video display panel included in the image generation unit 110.

The image compression unit 120 can uniformly or non-uniformly divide the image display area of the video display panel using a 3D structure optical system, for example, a 2D array type or a multi-lens type.

The image transmission device 200 includes an image transmission unit 210, the image transmission unit 210 transmits image information of the image compression unit 120 to the image enlargement unit 310 using wired or wireless communication technology. The image transmission unit 210 transmits images displayed on a display area decreased by the image compression unit 120 to the image enlargement unit 310.

When the image generation unit 110 and the image compression unit 120 are configured as described above, it is possible to apply various sizes of panels, for example, a micro display panel device, a small display panel, and a general display panel. Moreover, it is possible to manufacture the image transmission unit 210 that corresponds to the above-described panel and corresponds to various specifications (for example, a cross section area of an optical fiber and the number of fibers integrated into a cable) corresponding to requirements (for example, lightweight and wearable) of the image enlargement unit 310 and the mixed image output unit 320.

The image output device 300 may include the image enlargement unit 310, the mixed image output unit 320, and a projection direction controller 330. The image enlargement unit 310 enlarges images transmitted from the image transmission unit 210 in order to have a wide field-of-view effect.

The image enlargement unit 310 may enlarge images transmitted from the image transmission unit 210 using a variety of output methods. For example, the image enlargement unit 310 may enlarge images with a different magnification factor with respect to each of the plurality of transmitted images.

The mixed image output unit 320 outputs a mixed image in which images generated in the image enlargement unit 310 and in internal and external devices, and real-view information, are mixed. That is, the mixed image output unit 320 reflects images enlarged by the image enlargement unit 310 to a specific position and delivers the images to a user's eyes.

The projection direction controller 330 performs control such that an output direction of the output mixed image has one to six degrees of freedom (supporting respective control of one to six degrees of freedom including movement along X, Y, Z axis and rotation about each axis).

The mixed image output unit 320 may adjust a focus or a magnification of the image enlarged by the image enlargement unit 310.

The mixed image output unit 320 may register a plurality of projected images onto one screen. More specifically, the mixed image output unit 320 may register the plurality of projected images onto one screen to make natural images using a virtual reality for implementing an immersive image display, an edge blending method and an image warping method in the field of computer graphics.

The mixed image output unit 320 controls activation or inactivation of each of the plurality of pixels. That is, the mixed image output unit 320 controls pixels in units of pixels to open or close a pixel at a specific position.

In this way, when a pixel at a specific position is opened, projection of external images increases so that a see through effect may be shown, and when a pixel at a specific position is closed, external images are blocked and reflectivity of internal images increases so that it is possible to provide a clear image to a user's eyes.

The stereoscopic display system 1000 according to the embodiment of the invention can satisfy main requirements on, for example, resolution, field-of-view, weight, in HMD/FMD/EGD technology, and provide a natural immersive stereoscopic image.

Figure 2:
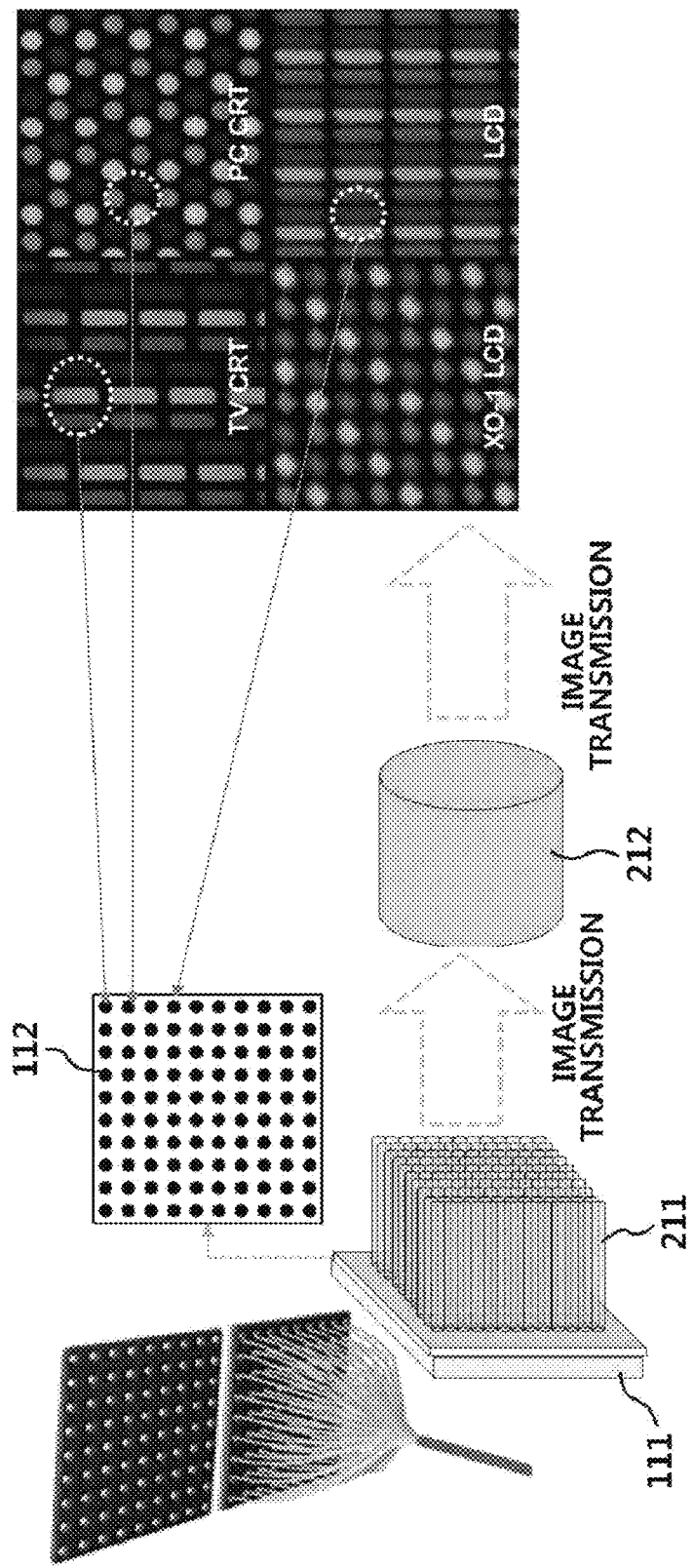
FIG. 2 is a conceptual diagram illustrating a structure of the stereoscopic display system according to the embodiment of the invention.
Figure 3:
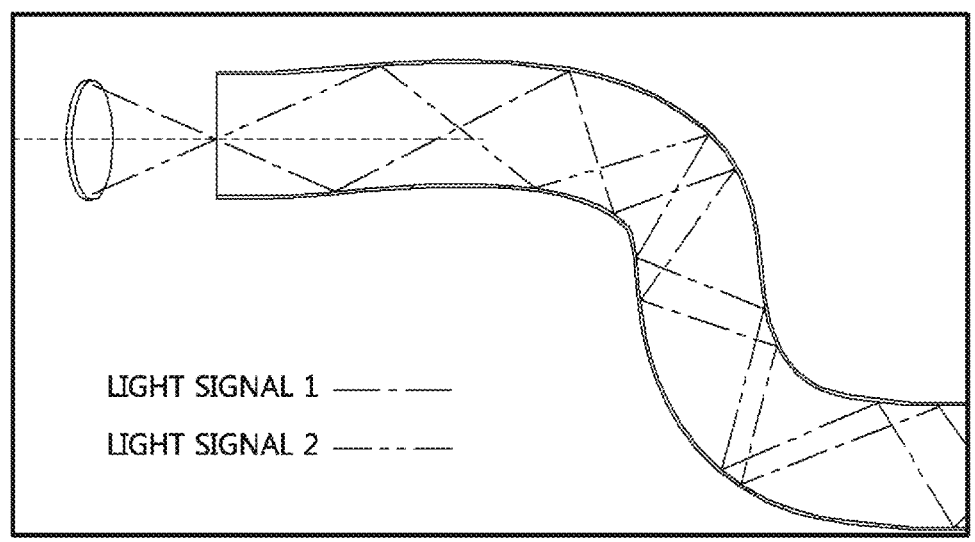
FIG. 3 is a conceptual diagram illustrating image transmission and deterioration in an optical fiber.
Figure 4:
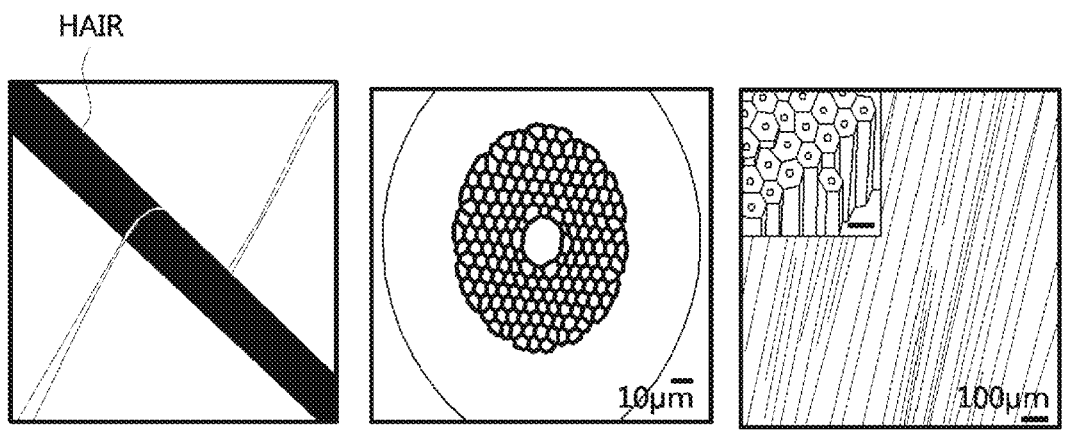
FIG. 4 is a conceptual diagram illustrating a case study of ultra-thin fiber optics research.

FIG. 2 is a conceptual diagram illustrating a structure of the stereoscopic display system according to the embodiment of the invention. FIG. 3 is a conceptual diagram illustrating image transmission and deterioration in an optical fiber. FIG. 4 is a conceptual diagram illustrating a case study of ultra-thin fiber optics research.

As illustrated in FIGS. 2 to 4, the stereoscopic display system 1000 according to the embodiment of the invention includes the video display panel 111 having a plurality of pixels to display images, an optical fiber bundle 211 that is provided to correspond to the plurality of pixels and outputs images displayed by the plurality of pixels, and a mask that is provided between the video display panel 111 and the optical fiber bundle 211 and is configured such that each of the plurality of pixels corresponds one-to-one with an incident surface of a corresponding optical fiber included in the optical fiber bundle 211.

Therefore, an optical fiber having a size to have one-to-one correspondence with pixels of the video display panel 111 is arranged so that it is possible to transmit images without a loss.

The video display panel 111 may generate pre-distortion images reflecting curvature information of the mixed image output unit 320.

In general, in transmission of images using the optical fiber, as illustrated in FIG. 3, an image blurring problem of an output end (that is, deterioration of image quality) occurs due to several times of reflection and refraction in the optical fiber when a plurality of pieces of image information (pixels) are simultaneously transmitted.

Here, the simultaneous transmission of the plurality of pieces of image information may refer to, for example, using one optical fiber having a cross section area the same as an area of the video display panel.

Therefore, the image generation unit 110 is configured to transmit one pixel in a screen image using one optical fiber, and a position correction mask 112 is applied such that a color source (for example, a red, green, blue, and white fluorescent substance) group forming exactly one pixel is projected onto one optical fiber, thereby accurately adjusting an arrangement of optical fibers.

For example, when the micro display panel generating a full HD level (1920.times.1080) pixel is used as the video display panel, the 2D mask 112 having m.times.n (1920.times.1080) holes therein in units of several um may be applied. In particular, as illustrated in FIG. 4, since research on ultra-thin fiber optics is continuing and production thereof is possible, it is possible to correspond to a ultra-high resolution panel of 300 dots per inch (DPI) or more.

Meanwhile, the image transmission unit 210 according to another embodiment of the invention may be composed of an optical fiber having a very small diameter and images may be transmitted such that each RGBW pixel included in the image generation unit 110 passes through one independent optical fiber.

Figure 5:
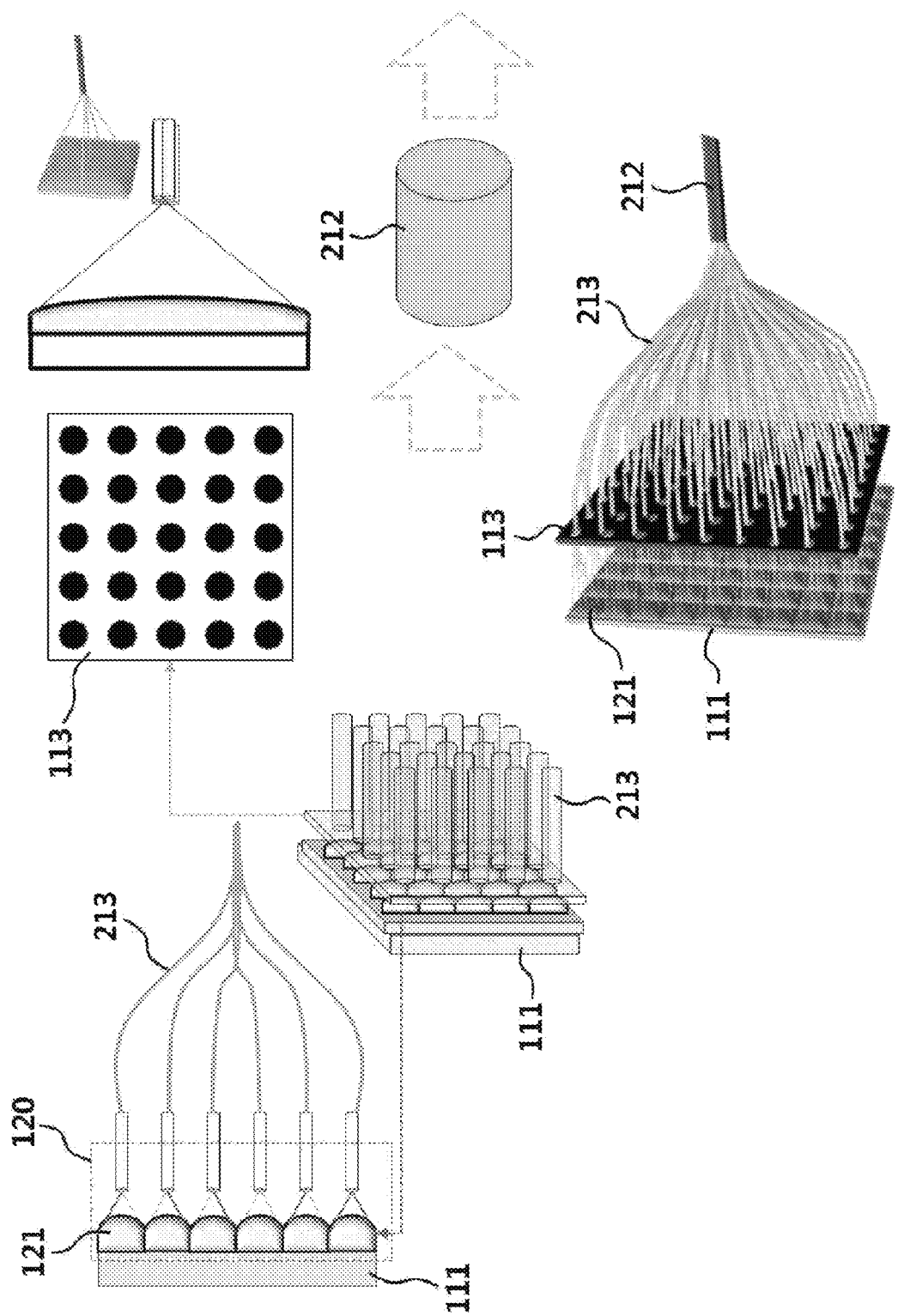
FIG. 5 is a conceptual diagram illustrating a structure of a stereoscopic display system according to another embodiment of the invention.

FIG. 5 is a conceptual diagram illustrating a structure of a stereoscopic display system according to another embodiment of the invention.

When the stereoscopic display system 1000 is configured as described with reference to FIGS. 2 to 4, a cross section area of an optical fiber cable required for transmission corresponds to an area of the video display panel 111.

In this case, when the number of required optical fibers and a cross section area of the image generation unit 110 increase due to an increased resolution of the image generation unit 110, a cross section area and a volume of the image transmission unit 210 increase so that it is difficult to mount the image enlargement unit 310 and the mixed image output unit 320 on a user's head. Moreover, in the development of wearable display devices (HMD/FMD/EGD), the image transmission unit 120 may be configured as in FIG. 5 in a case in which a size of an available video display panel component and a resolution of final images projected onto a user's eyeballs do not match or a volume (cross section) of the image transmission unit 210 needs to be minimized.

As illustrated in the upper right corner in FIG. 5, it is possible to decrease the volume of the image transmission unit using an ultra-thin optical cable that can correspond to overall pixels of the video display panel, given a certain ratio of image quality deterioration.

However, when the generated image is compressed using a single optical system (lens) as in the upper right figure, since image distortion increases and aberration occurs as moves further from a center of the video display panel, m'×n' 2D multi-lens array 121 is applied.

Here, the 2D multi-lens array 121 is provided between one surface of the video display panel 111 and one surface of the 2D mask (a position correction mask) 113, and are configured to uniformly or non-uniformly divide the image display area of the video display panel 111.

The 2D mask 113 corrects a position such that a small optical fiber bundle group 213 binding a few optical fibers is accurately arranged to each cell of the 2D multi-lens array 121.

When the stereoscopic display system 1000 according to the embodiment of the invention is implemented as a wearable display device, it is possible to eliminate the constraint of a panel size, for example, a micro display panel device (for example, a display panel device having a size of 1 inch or smaller), a small display panel (for example, a panel component for a smart phone that supports a HD level high resolution of substantially 250 DPI or more) and a general display panel, when the image generation unit 110 and the image enlargement unit 120 are configured as in FIG. 5.

In addition, it is possible to manufacture the image transmission unit 210 that corresponds to the above-described video display panel and various specifications of the stereoscopic display system 1000.

Here, requirements of the image enlargement unit 310 and the mixed image output unit 320 may be, for example, a lightweight in terms of wearability, and various specifications corresponding to the requirements of the image enlargement unit 310 and the mixed image output unit 320 may be, for example, a cross section area of an optical fiber and the number of fibers bound to a cable.

The 2D mask 113, which can correct a position corresponding to characteristics of components of the image generation unit 110 and the image compression unit 120 and structural characteristics of the image enlargement unit 310 and the mixed image output unit 320, may be changed in a variety of patterns, for example, a lattice shape, a radial shape, and a uniform or non-uniform partitioning structure.

Here, the characteristics of components of an image generating device 100, may refer to, for example, various arrangement patterns of a RGBW fluorescent material as illustrated in the upper right corner in FIG. 2, and the structural characteristics of the image output device 300 may refer to, for example, a shape of a projection screen.

Figure 11:
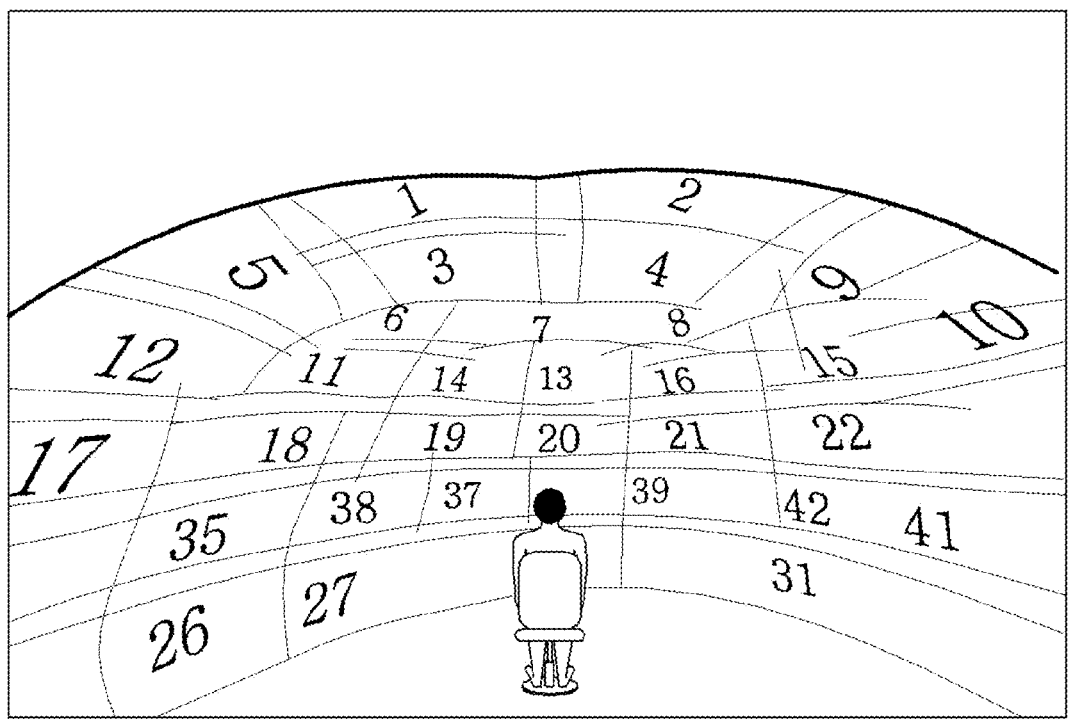
FIG. 11 is a conceptual diagram illustrating image registering of a plurality of projection images projected onto a curved screen onto one screen.

When images generated in the video display panel 111 are enlarged using various output methods in the image enlargement unit 310, various patterns described above are necessary in order to actively correspond to different shapes and sizes of areas where images overlap when image information transmitted using each small lens is projected onto the projection plane having a variety of shapes (refer to FIG. 11).

Here, the video display panel 111 may generate pre-distortion images reflecting curvature information of the mixed image output unit 320 and generate boundary correction images for an edge blending process.

Figure 6:
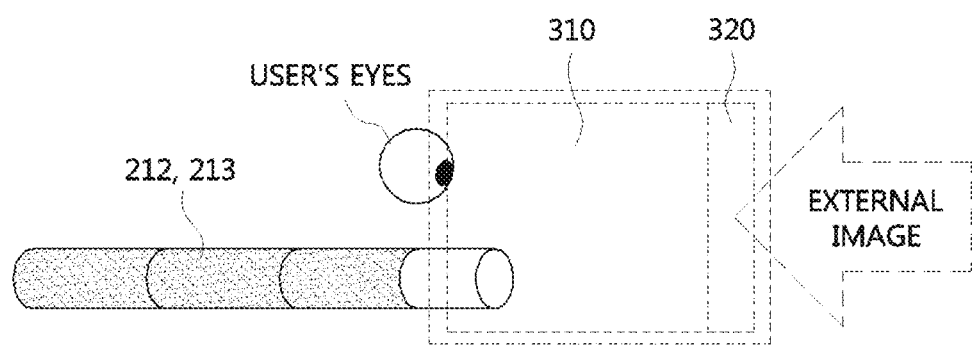
FIG. 6 is a conceptual diagram illustrating an environment in which a wide field-of-view image is provided to a user's eyes.

FIG. 6 is a conceptual diagram illustrating an environment in which a wide field-of-view image is provided to a user's eyes.

As illustrated in FIG. 6, the image transmission unit 210 transmits image information to a user's eyes using optical fiber bundles 212 and 213, and the image enlargement unit 310 directly projects the image information transmitted using the optical fiber bundles 212 and 213 on a user's eye or projects on a user's eye through a reflective optical system.

The mixed image output unit 320 outputs image information generated from a plurality of display devices to be naturally accommodated by the user.

The image transmission unit 210 may be provided when an optical fiber having a cross section area of um or less is used.

Figure 7:
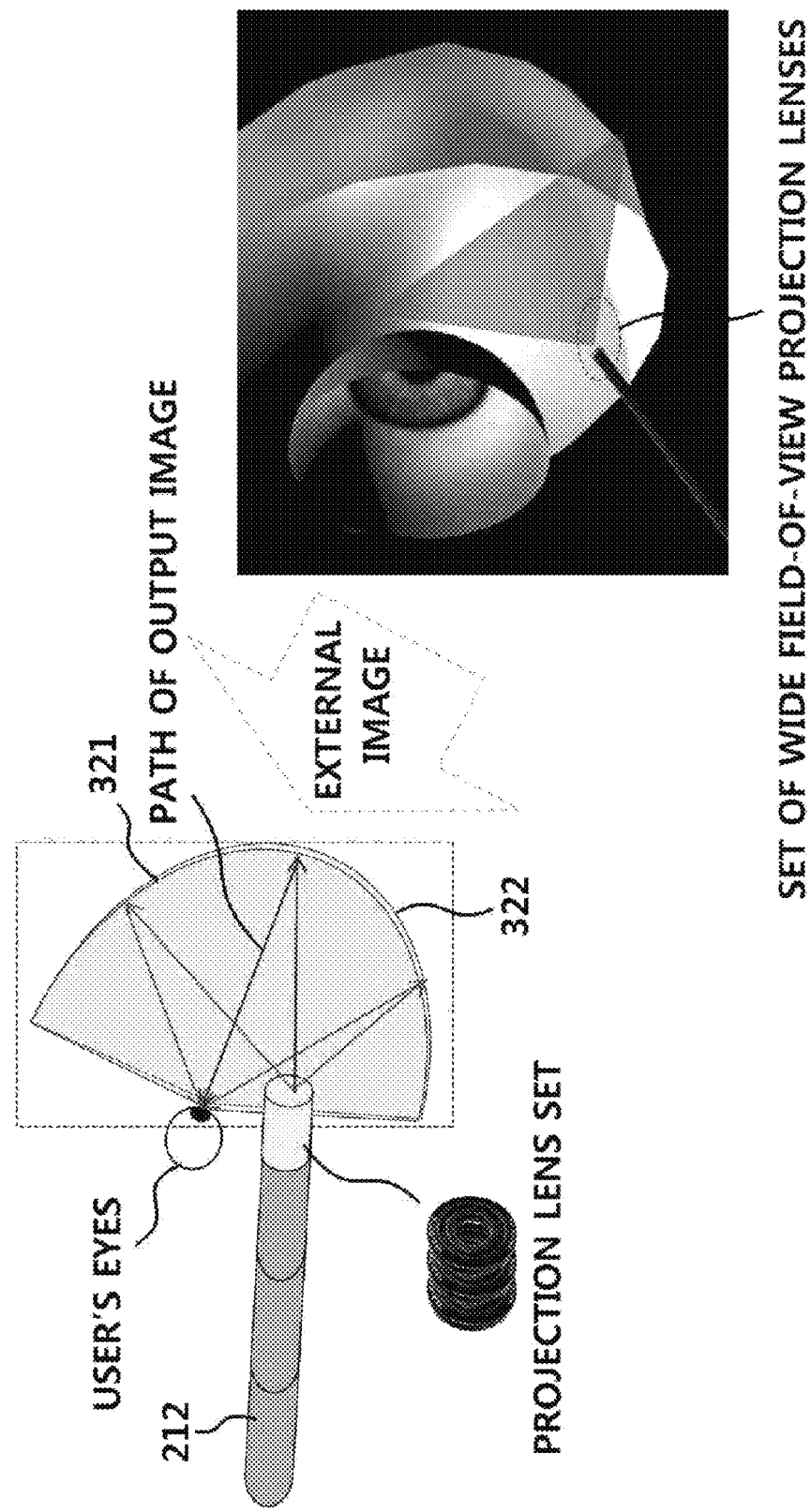
FIG. 7 is a conceptual diagram illustrating structures of an image enlargement unit and a mixed image output unit according to the embodiment of the invention.
Figure 8:
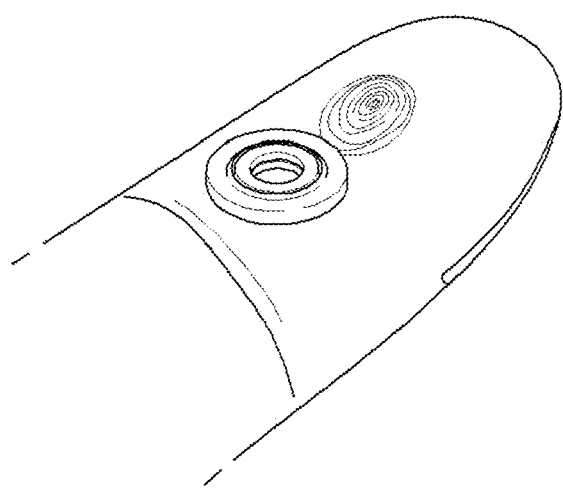
FIG. 8 is a conceptual diagram illustrating a liquid lens used in the embodiment of the invention.

FIG. 7 is a conceptual diagram illustrating structures of the image enlargement unit and the mixed image output unit according to the embodiment of the invention. FIG. 8 is a conceptual diagram illustrating a liquid lens used in the embodiment of the invention.

As illustrated in FIGS. 7 and 8, an ending portion of the image transmission unit 210 composed of a large optical fiber bundle group 212 extends to a side of a user's eye, and a semi-transparent mirror 321 having an aspheric shape, that can reflect images output from an end portion of the optical cable and deliver the images to a user's eyes, is provided.

Here, a set of a plurality of micro lens having a fixed magnification may be provided in order to correct a focal length, a magnification, distortion of the output images. However, in order to correspond to various visual conditions of the user, as illustrated in FIG. 8, a projection lens unit is composed of a single or a plurality of liquid lenses that can adjust the magnification.

Figure 9:
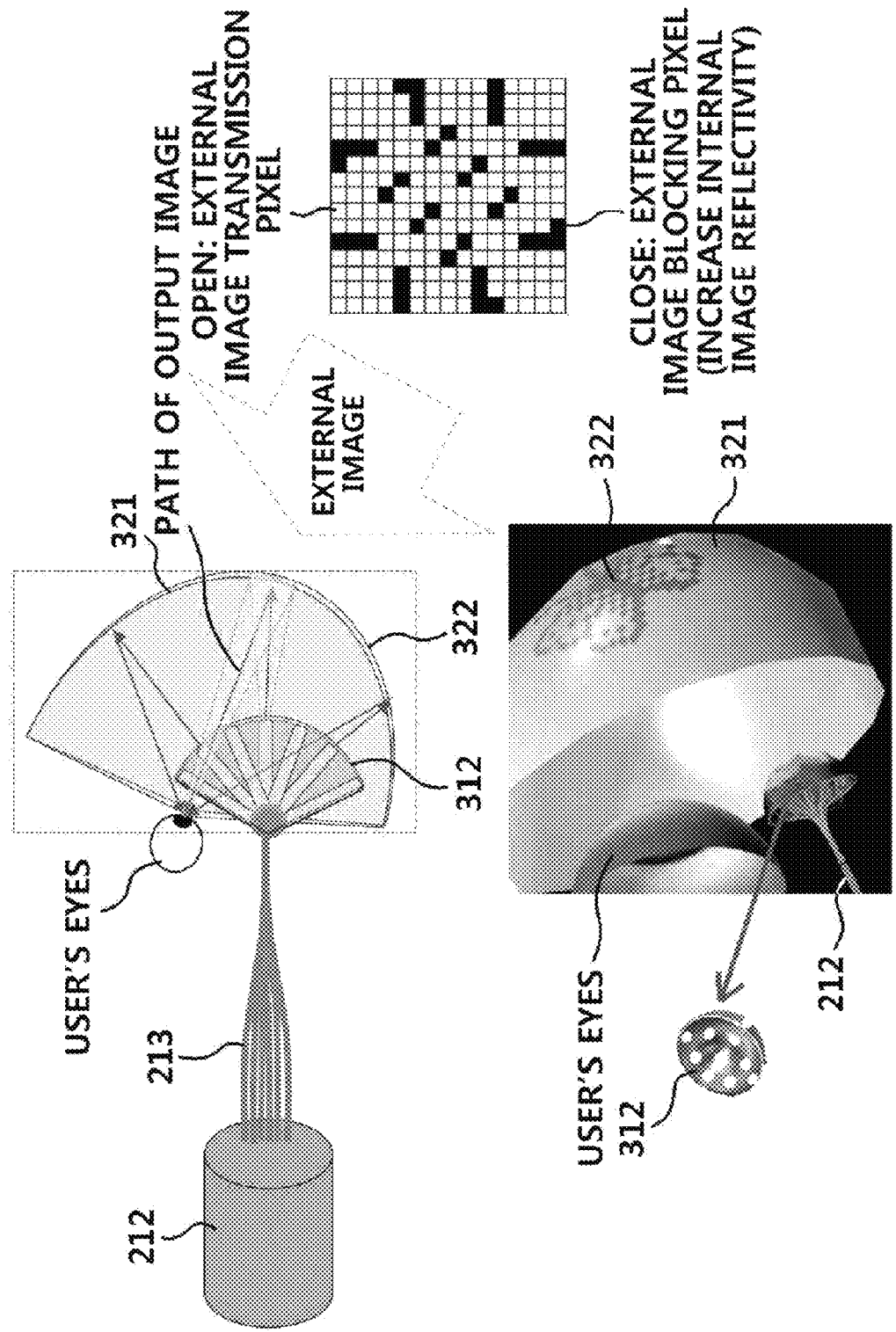
FIG. 9 is a conceptual diagram illustrating structures of an image enlargement unit and a mixed image output unit according to another embodiment of the invention.
Figure 10:
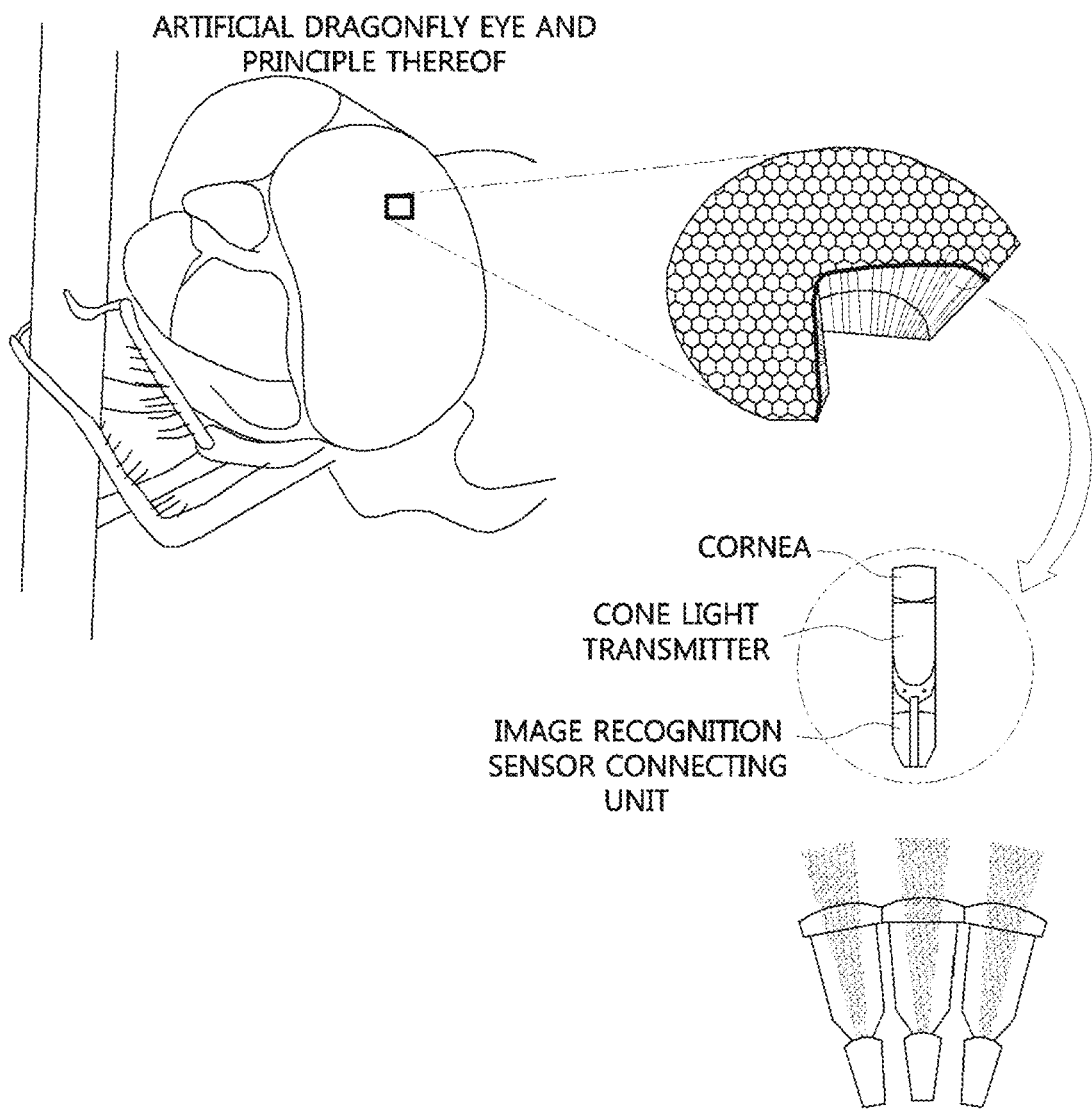
FIG. 10 is a conceptual diagram illustrating a method of composing the image enlargement unit according to the embodiment of the invention.

FIG. 9 is a conceptual diagram illustrating structures of an image enlargement unit and a mixed image output unit according to another embodiment of the invention. FIG. 10 is a conceptual diagram illustrating a method of composing the image enlargement unit according to the embodiment of the invention. FIG. 11 is a conceptual diagram illustrating image registering of a plurality of projection images projected onto a curved screen onto one screen.

Generation of natural images corresponding to an aspheric curved surface having a wide area may be difficult using one projection unit, and manufacturing of a small projection lens unit may be difficult due to a combination of a plurality of lenses for image correction. Accordingly, it is difficult to provide images that can fully fill the user's field-of-view using the configuration of the image projection unit composed of a combination of the micro lenses proposed in FIG. 7. A method to address those problems will be described below.

As illustrated in FIGS. 9 to 11, the image enlargement unit 310 is composed of a plurality of micro projection units similar to a structure of a dragonfly's eye in FIG. 10, and a radial projection structure having a curved surface with an equal interval or an unequal interval is formed using a corrective curved mask 312 that can correct a position of an output end.

Here, the corrective curved mask 312 is provided between the optical fiber bundle and the reflecting surface of the semi-transparent mirror 321 and has a radial structure having a curved surface with an equal interval or an unequal interval. The structure of a dragonfly's eye includes a plurality of packed ommatidium and visualizes an object in a mosaic method. The ommatidium of the dragonfly's eye only accept lights incoming in a straight line, each of the ommatidium simultaneously sends image signals to a brain, and it has good effectiveness for recognizing images that is quickly passing.

The images projected from a radial-shaped image output end 311 to which the respective small optical fiber bundle group 213 is connected are visualized on the semi-transparent mirror 321 such that a boundary of the respective projected image is overlapped, as illustrated in FIG. 11.

Here, as illustrated in FIG. 11, in technology (large dome screen projection technology) in which a combination of a small units of images is output to a large curved surface, it is possible to make a natural image using a virtual reality for implementing an immersive image display and an edge blending method and an image warping method in the field of computer graphics.

A curved pixel reflection-transmission adjusting mask 322 is attached on the reflecting surface of the semi-transparent mirror 321. When a pixel at a specific position is opened using a transmission and reflectivity adjusting mask component that can control pixels in units of pixels, external images are blocked and reflectivity of internal images increases so that it is possible to provide a clear image to a user's eyes.

Figure 12:
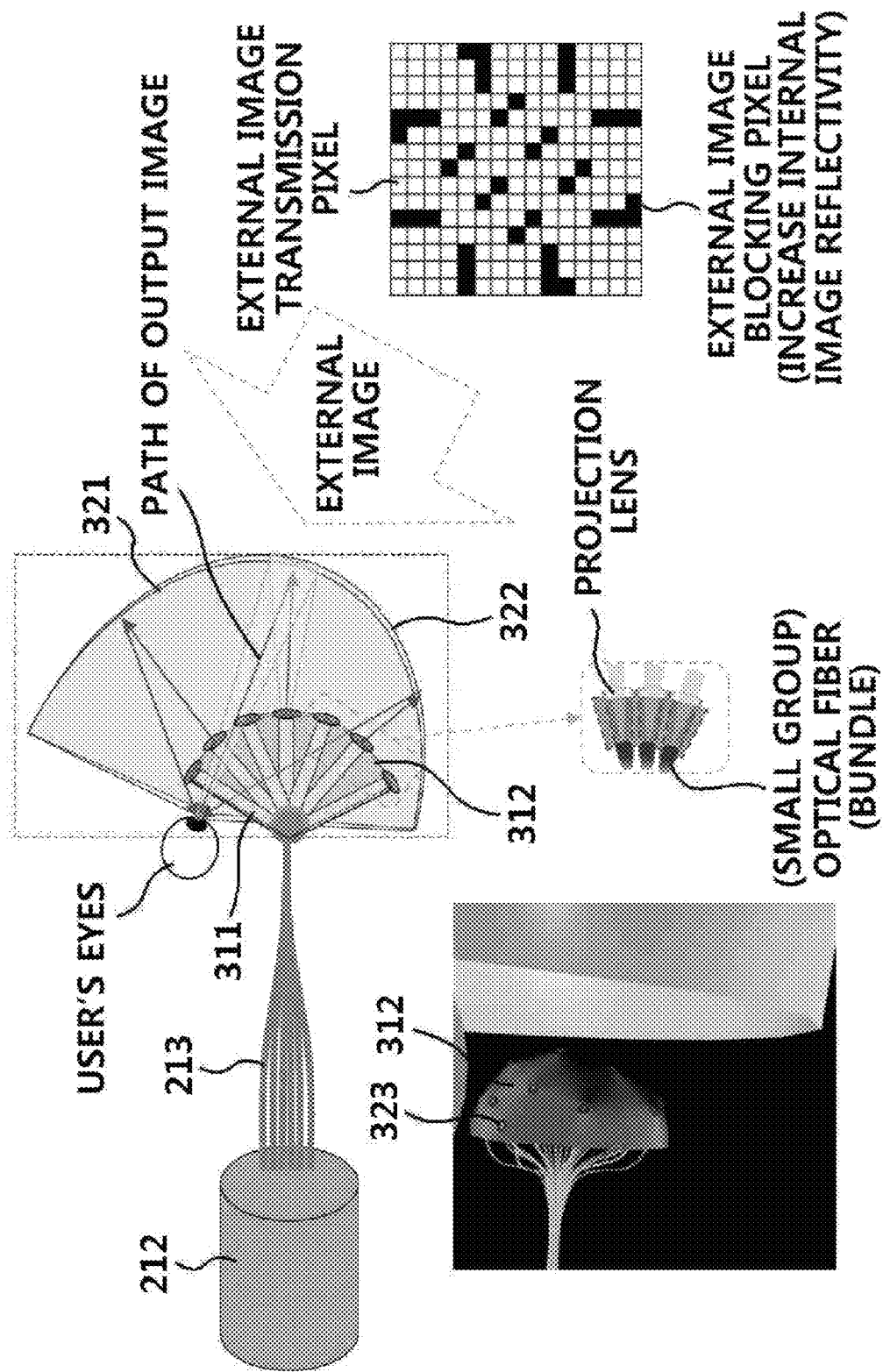
FIG. 12 is a conceptual diagram illustrating structures of an image enlargement unit and a mixed image output unit according to still another embodiment of the invention.
Figure 13:
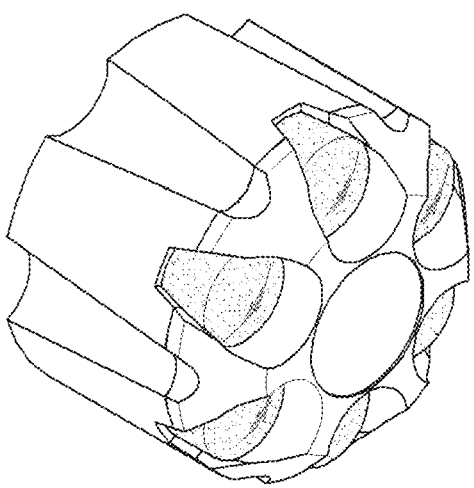
FIG. 13 is a diagram illustrating a projection lens having a fixed magnification.

FIG. 12 is a conceptual diagram illustrating structures of an image enlargement unit and a mixed image output unit according to still another embodiment of the invention. FIG. 13 is a diagram illustrating a projection lens having a fixed magnification.

As illustrated in FIGS. 12 and 13, it is possible to configure a projection optical unit by providing a projection lens having a fixed magnification or the liquid lens in FIG. 8 on an output surface of the small optical fiber bundle group 213 fixed to the corrective curved mask 312.

In the wearable display (HMD/FMD/EGD), a virtual image surface (virtual screen) formed in front of a user's eye is fixed at a specific distance or position according to unique parameter values (for example, a magnification and a focal length) of the optical system. Moreover, the user may feel constant sense of distance by reflecting disparity information to images output to both eyes in order to express a 3D stereoscopic image.

However, when the virtual screen for outputting images described above is fixed, there is a problem in that a natural stereoscopic image having negative parallax and positive parallax is expressed only within a limited range with respect to the screen.

When the technology in FIG. 12 is applied, it is possible to actively control a position of the virtual screen of the wearable display. Therefore, it is possible to express a virtual object at a distance where the user feels natural depth perception in front of the user's eye using more various values than conventional methods.

Figure 14:
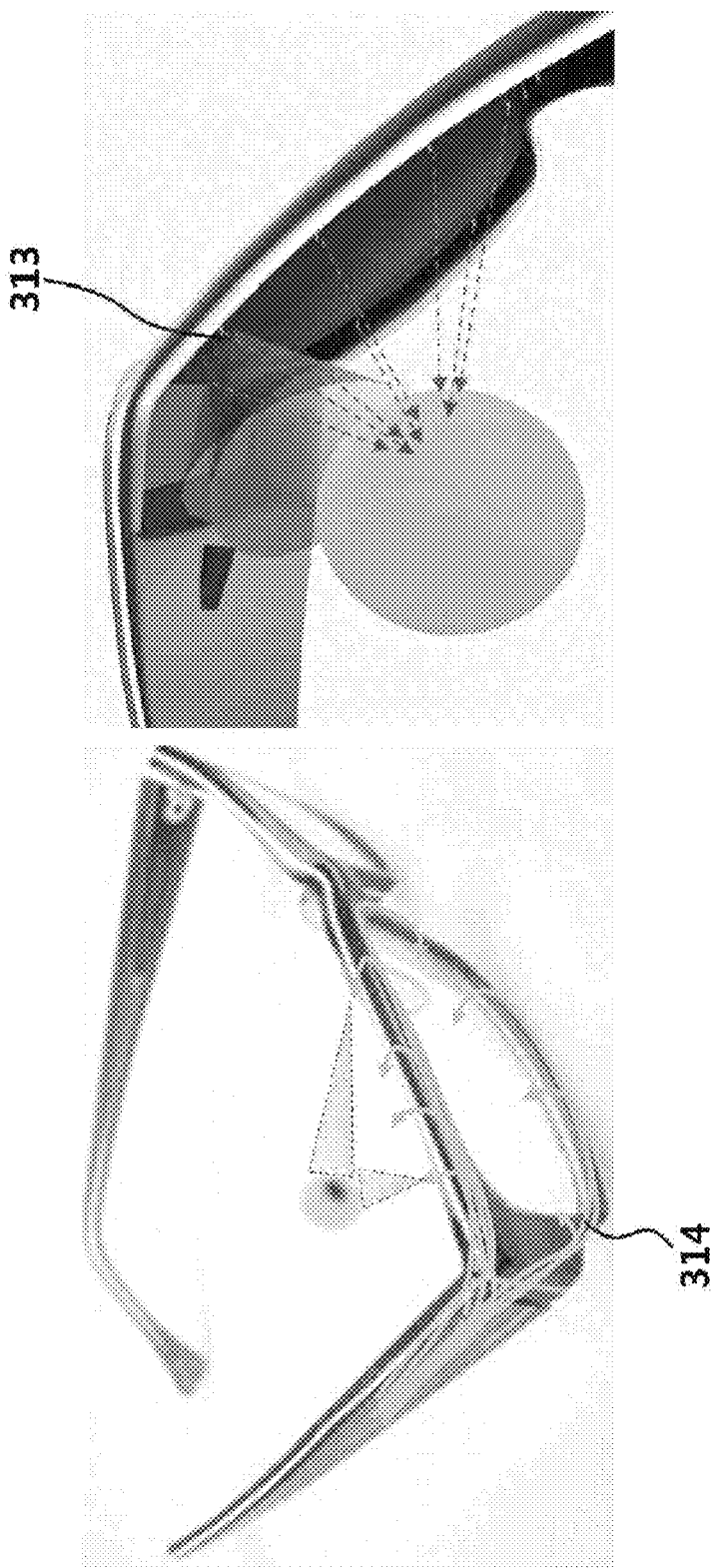
FIG. 14 is a conceptual diagram illustrating structures of the image enlargement unit and the mixed image output unit according to still another embodiment of the invention.

FIG. 14 is a conceptual diagram illustrating structures of the image enlargement unit and the mixed image output unit according to still another embodiment of the invention.

In FIG. 12, image information of packed optical fibers is delivered to the user's eye (pupil) through a radial-shaped enlarging unit. However, in FIG. 14, optical fibers are directly, radially disposed along with a frame of a wearing unit and then images are respectively projected to be converged on around of the user's eye.

In general, in images recognized by a human's eye, a main interesting area is recognized with a high resolution and a periphery image is recognized in blur so that it is possible to mix the method (radial-shaped projection) described in FIG. 12.

That is, a plurality of image projection units enlarged at a low magnification are concentrated on a portion of presenting a high resolution image on a macula (a part of a retina which contains a high density of optic nerves and recognizes a high resolution image), and a periphery image portion is enlarged with a high magnification. The overall image is implemented with a combination of the small number of image outputs in which a low resolution is presented and a projection area is enlarged. Therefore, the user may experience a fully immersive wide field-of-view image the same as the reality.

Figure 15A:
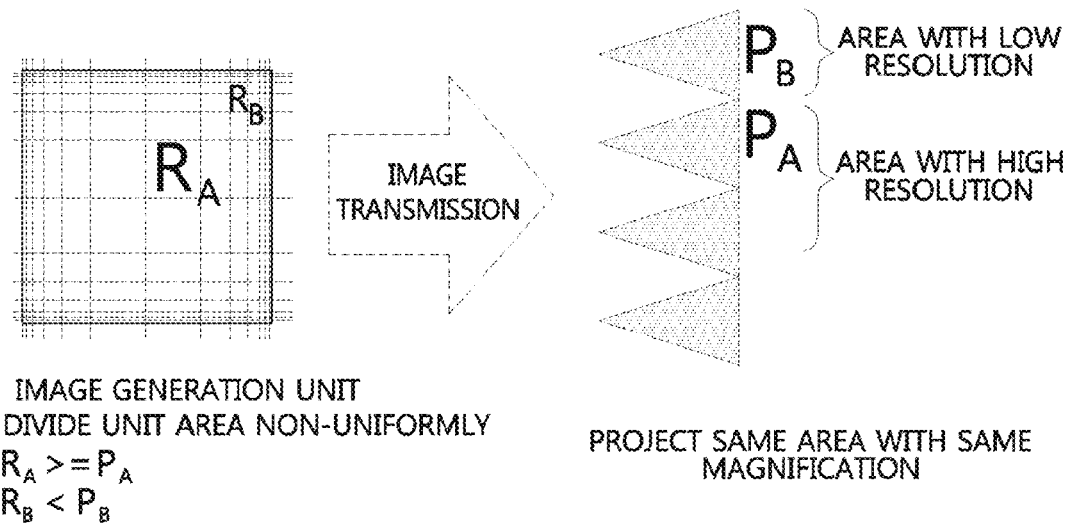
FIG. 15A is a conceptual diagram illustrating a method of differentiating between areas corresponding to the image generation unit and the mixed image output unit.

FIG. 15A is a conceptual diagram illustrating a method of differentiating between areas corresponding to the image generation unit and the mixed image output unit.

As illustrated in FIG. 15A, an interface that can correspond to a human's wide field-of-view and to visual characteristics for observing an interesting area with a high resolution is manufactured. When images are split and transmitted from the video display panel of the image generation unit to the image transmission unit, the area of the video display panel is non-uniformly allocated according to an area of the video display panel allocated in the image compressing operation. That is, the area of the video display panel is non-uniformly allocated by $R_A$ and $R_B$ and projection is performed on the same area with the same magnification.

Then, when the image enlargement unit 310 and the mixed image output unit 320 project with the same magnification (apply a position correction mask having a constant interval), it is possible to provide a wide field-of-view display that presents images on a user's interesting area with a high resolution.

Figure 15B:
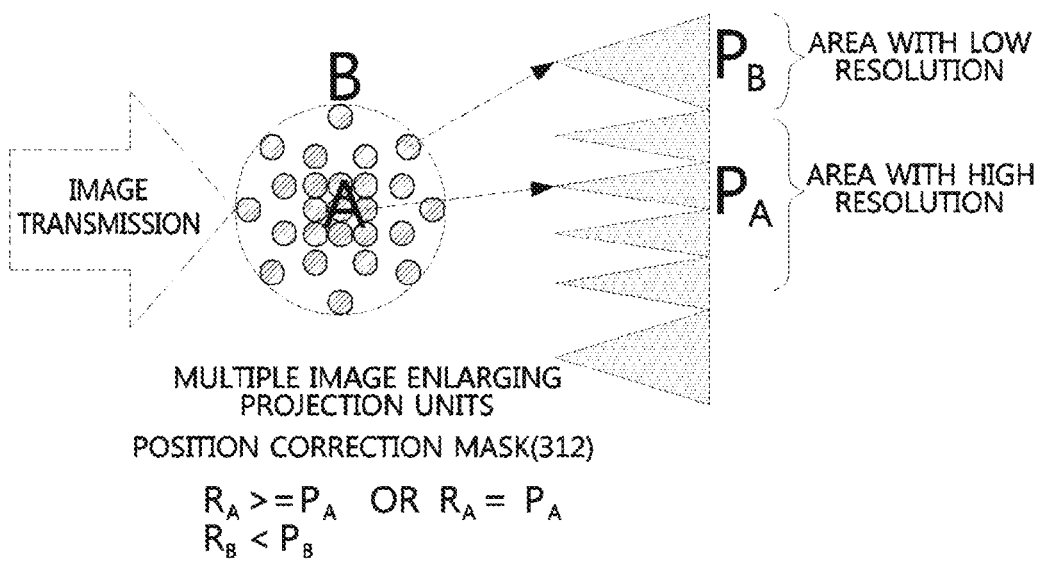
FIG. 15B is a conceptual diagram illustrating projection pattern transformation of the mixed image output unit and a method of differentiating a projected screen area.

FIG. 15B is a conceptual diagram illustrating projection pattern transformation of the mixed image output unit and a method of differentiating a projected screen area.

As illustrated in FIG. 15B, projection modules are non-uniformly arranged by controlling the position correction mask 312 that controls an arrangement pattern of multiple image enlarging projection units. When the control is performed using a different magnification factor, more images are transmitted to the high-resolution area so that it is possible to provide a clear and more immersive wide field-of-view display.

Figure 16:
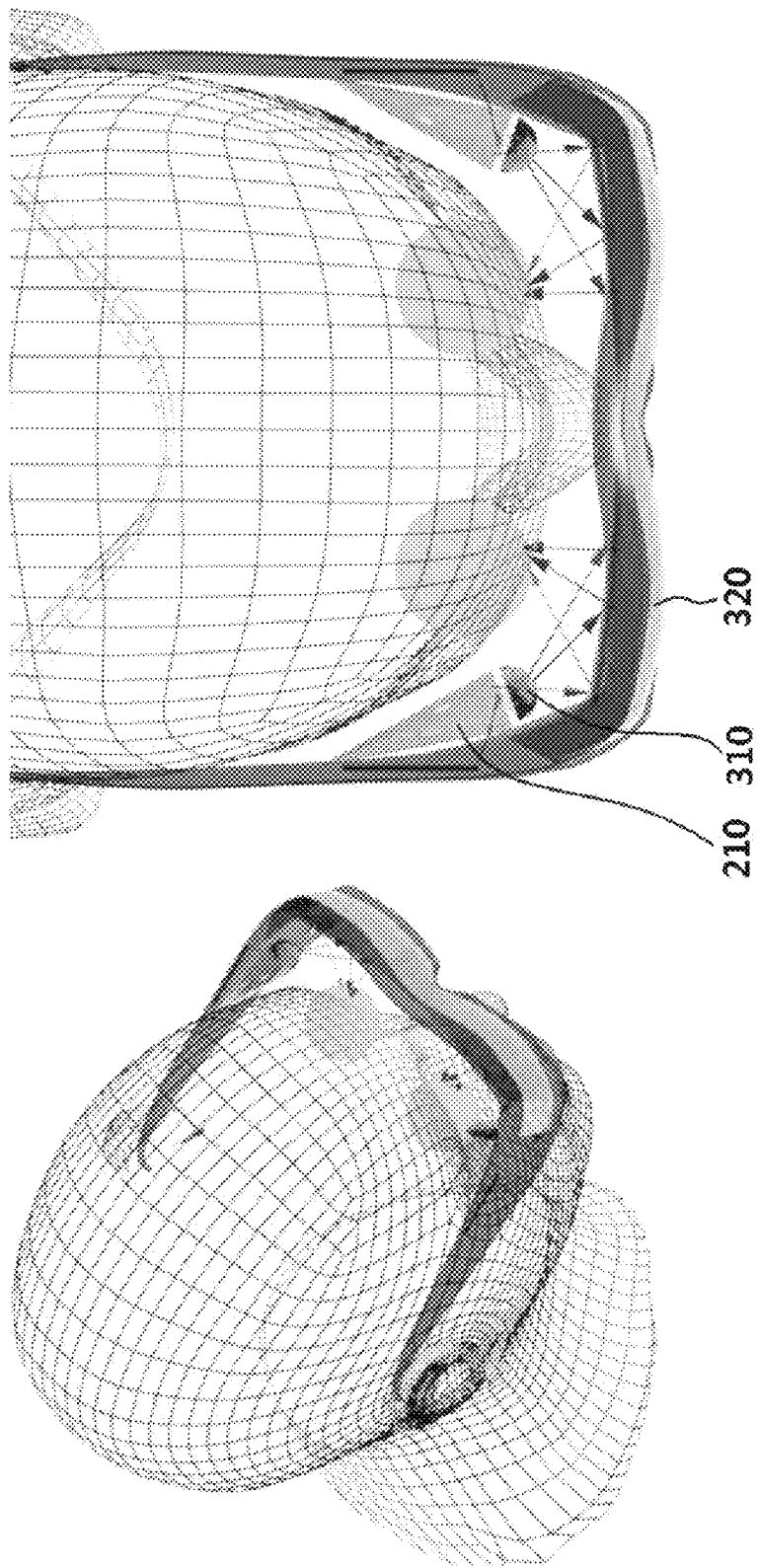
FIG. 16 is a diagram illustrating an example implementation of the stereoscopic display system according to the embodiment of the invention.

FIG. 16 is a diagram illustrating an example implementation of the stereoscopic display system according to the embodiment of the invention.

As illustrated in FIG. 16, the image transmission unit includes a set of optical fiber cables (an eyeglasses type) and has a volume that allows the unit to be embedded into a leg portion of a wearing unit.

The mixed image output unit 320 has a volume that allows the unit to be sufficiently embedded when an internal space of a user's eye side portion (temple) of the wearing unit is spaciously designed.

A curved reflection lens unit in which a position of the image enlargement unit 310 and a position of the user's eye serve as a center point may be manufactured as a screen of the mixed image output unit 320. An appearance of the wearing unit and the position of the image enlargement unit may be changed, and a semi-transparent reflection lens having an aspheric shape may be embedded into the mixed image output unit 320.

Figure 17:
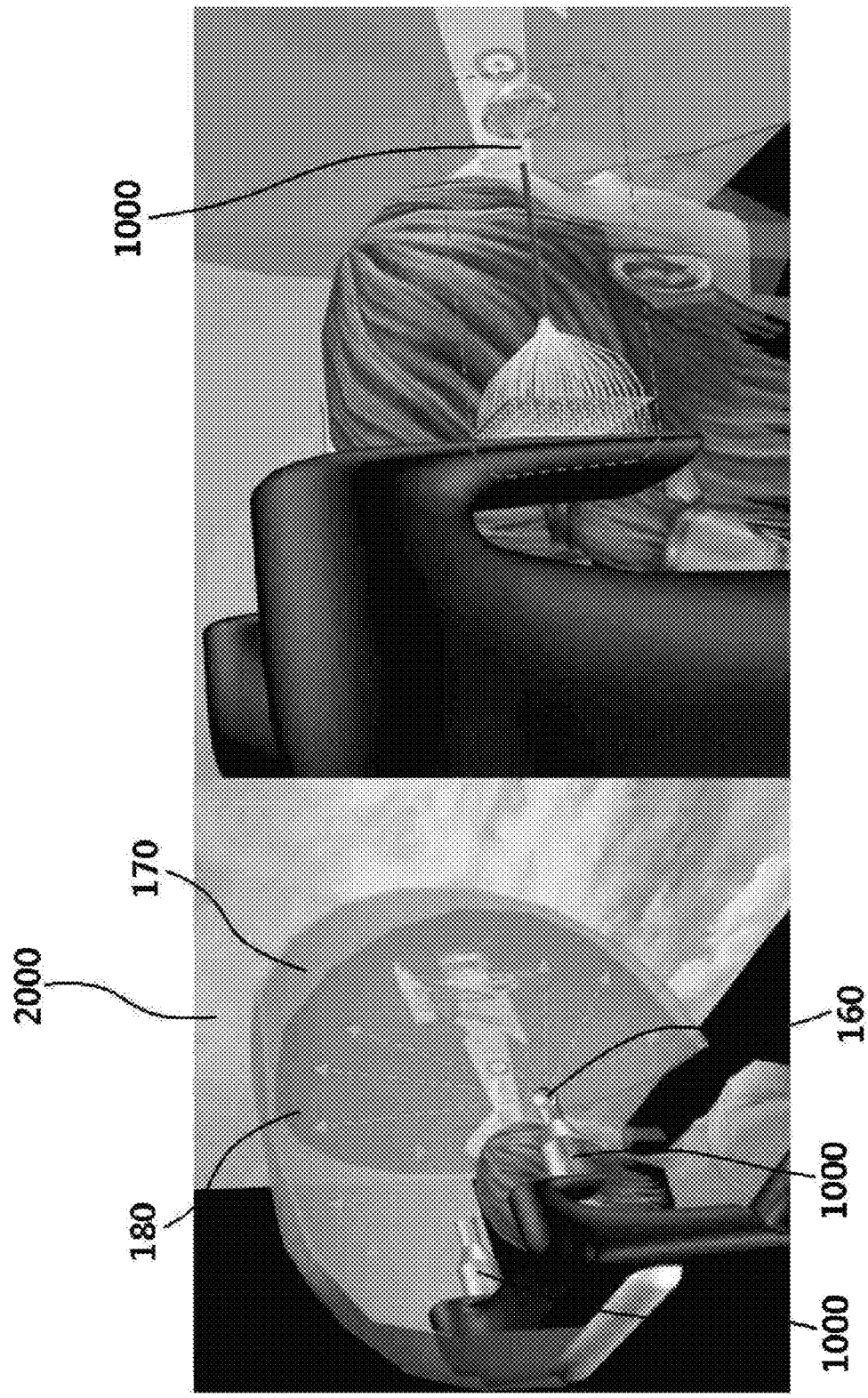
FIG. 17 is a diagram illustrating an example implementation of the stereoscopic display system according to another embodiment of the invention.

FIG. 17 is a diagram illustrating an example implementation of the stereoscopic display system according to another embodiment of the invention.

As illustrated in FIG. 17, the stereoscopic display system according to another embodiment of the invention provides the same effect without wearing artifacts on the user's body.

More specifically, the system is manufactured such that an image projection unit is positioned in the vicinity of a user's gaze (for example, in the vicinity of a chair headrest), and images to be provided in both eyes may be projected onto a personal fully immersive curved surface, an aspheric surface, or a horopter surface screen 180 that represents a stereoscopic vision characteristics of a human.

The personal fully immersive projection screen 180 is made of a semi-transparent/partial reflective or fully reflective material, and information on an external image presenting screen 2000 is selectively provided to the user using an external image transmittance adjusting mask 170.

Single or plural stereoscopic display systems 1000 (for example, a stationary wide field-of-view output interface device) may be disposed according to a design of a seating unit and requirements for content scenarios.

When the projection direction controller 330, which can actively control a projection direction with one to six degrees of freedom (supporting respective control of one to six degrees of freedom including movement along X, Y, Z axis and rotation around an axis), is provided at an end portion of the mixed image output unit 320, and a user's gaze tracking module included in a personal image project screen is used, it is possible for the user to provide the image effects described in FIG. 15 according to a user's gaze (view vector) direction.

While the present invention has been described with reference to exemplary embodiments, it will be understood by those skilled in the art that various changes and modifications may be made without departing from the spirit and scope of the present invention as defined by the appended claims.

While the example embodiments of the present invention and their advantages have been described in detail, it should be understood that various changes, substitutions and alterations may be made herein without departing from the scope of the invention.

REFERENCE NUMERALS

| | | | |
|---|---|---|---|
| 1000: | stereoscopic display system | 100: | image generating device |
| 110: | image generation unit | 111: | video display panel |
| 113: | 2D mask | 120: | image compression unit |
| 121: | 2D multi-lens array | 200: | image transmission device |
| 210: | image transmission unit | 211, 212, and 213: | optical fiber bundle |
| 300: | image output device | 310: | image enlargement unit |
| 311: | radial-shaped image output end | 312: | corrective curved mask |
| 320: | mixed image output unit | 321: | semi-transparent mirror |
| 322: | curved pixel reflection-transmission adjusting mask | | |
| 330: | projection direction controller | 170: | external image transmittance adjusting mask |
| 180: | personal fully immersive projection screen | | |
| 2000: | external image presenting screen | | |

What is claimed is:

1. An image generating device comprising:
an image generation unit comprising a video display panel having a plurality of pixels and displays images; and
an image compression unit comprising a 3D structure optical system provided at one surface of the video display panel to receive the images such that a physical space required for delivering the images is decreased.

2. The device of claim 1, wherein the image generation unit displays images on the video display panel by allocating a first-sized display area when a first priority is satisfied, and displays images on the video display panel by allocating a second-sized display area, smaller than the first-sized display area, when a second priority is satisfied.

3. The device of claim 1, wherein the image compression unit uniformly or non-uniformly divides a display area of the video display panel.

4. An image output device comprising:
an image enlargement unit configured to enlarge received images, wherein the image enlargement unit comprises at least one of a projection lens set or a plurality of micro projection units; and
a mixed image output unit comprising a semi-transparent mirror configured to output a mixed image in which the enlarged images and external images are mixed.

5. The device of claim 4, further comprising circuitry configured to perform control via a projection direction controller such that an output direction of the output mixed image has at least one out of six degrees of freedom.

6. The device of claim 4, wherein the mixed image output unit adjusts a focus or a magnification of the enlarged images.

7. The device of claim 4, wherein the mixed image output unit projects the enlarged images and reflects the projected enlarged images to a specific position.

8. The device of claim 7, wherein the mixed image output unit registers the projected enlarged images onto one screen using an edge blending method and an image warping method.

9. A stereoscopic display system comprising:
an image generating device comprising a video display panel having a plurality of pixels to display images and a 3D structure optical system provided at one surface of the video display panel to receive the images such that a physical space required for delivering the images is decreased;
an image transmission device comprising optical fiber bundles configured to transmit the images received by the 3D structure optical system; and
an image output device comprising an image enlargement unit configured to enlarge the transmitted images and a semi-transparent mirror configured to output a mixed image in which the enlarged images and external images are mixed, wherein the images enlargement unit comprises at least one of the projection lens set or a plurality of micro projection units.

10. The stereoscopic display system of claim 9, wherein the image generating device is configured to uniformly or non-uniformly divide a display area of the video display panel.

11. The stereoscopic display system of claim 9, wherein the image output device is configured to project the enlarged image and register the projected image onto one screen using an edge blending method and an image warping method.

* * * * *